United States Patent [19]

Medford

[11] 4,401,718

[45] Aug. 30, 1983

[54] PROCESS FOR APPLYING A SECOND SILICONE RESIN COATING COMPOSITION OVER A FIRST SILICONE RESIN COATING COMPOSITION

[75] Inventor: George F. Medford, Clifton Park, N.Y.

[73] Assignee: General Electric Company, Waterford, N.Y.

[21] Appl. No.: 437,772

[22] Filed: Oct. 29, 1982

[51] Int. Cl.³ .............. B32B 9/04; B05D 3/04; B29C 17/08
[52] U.S. Cl. .................... 428/448; 156/94; 156/99; 156/668; 351/166; 427/307; 427/162; 427/140; 428/161
[58] Field of Search ........... 427/307, 322, 387, 140, 427/162, 163, 164; 428/142, 156, 161, 447, 412, 448, 451; 260/29.2 M; 351/166; 156/94, 99, 106, 668; 252/79.2, 79.5

[56] References Cited

U.S. PATENT DOCUMENTS

| | | | |
|---|---|---|---|
| 2,786,042 | 3/1957 | Iler | 260/37 |
| 3,976,497 | 8/1976 | Clark | 106/287 SE |
| 3,986,997 | 10/1976 | Clark | 260/29.2 M |
| 4,027,073 | 5/1977 | Clark | 428/412 |
| 4,177,315 | 12/1979 | Ubersax | 428/336 |
| 4,191,804 | 3/1980 | Weber | 428/409 |
| 4,211,823 | 7/1980 | Suzuki et al. | 428/412 |
| 4,277,287 | 7/1981 | Frye | 106/287.12 |
| 4,299,746 | 11/1981 | Frye | 260/29.2 M |
| 4,309,319 | 1/1982 | Vaughn | 260/9 |
| 4,315,046 | 2/1982 | Frye | 427/322 |

FOREIGN PATENT DOCUMENTS 2025444 4/1979 United Kingdom .......... 260/29.2 M

*Primary Examiner*—William A. Powell
*Attorney, Agent, or Firm*—Gary L. Loser

[57] ABSTRACT

A method for adhering a second silicone resin hard coating composition to the surface of a scratched or marred first silicone resin hard coating composition comprising etching the surface of the first hard coating composition with a caustic solution, rinsing and drying said first hard coating composition, applying a curable second silicone resin hard coating composition to said first silicone resin hard coating composition, and curing said second silicone resin hard coating composition. A tint can be applied to a theretofore clear substrate by including a tint or dye in the second silicone resin hard coating composition.

27 Claims, No Drawings

PROCESS FOR APPLYING A SECOND SILICONE RESIN COATING COMPOSITION OVER A FIRST SILICONE RESIN COATING COMPOSITION

BACKGROUND OF THE INVENTION

The present invention relates to protective coating compositions and articles coated therewith. More particularly, the present invention relates to a method for applying a second silicone resin coating composition over a first silicone resin coating composition which has become scratched or marred, or which requires a tint.

Recently the substitution of glass glazing with transparent materials which are more resistant to shattering than glass has become widespread. For example, transparent glazing made from synthetic organic polymers is now utilized in public transportation vehicles such as trains, buses and airplanes. Lenses, such as for eyeglasses, as well as glazing for large buildings also employ such shatter resistant plastics. One of the most promising and widely used transparent plastics is polycarbonate, such as that known as LEXAN ®, sold by General Electric Company.

While transparent plastics provide the advantage of being more resistant to shattering than glass, a serious drawback lies in the ease with which these plastics mar and scratch due to everyday contact with abrasives such as dust, cleaning equipment and ordinary weathering. Continuous scratching and marring results in impaired visibility and poor aesthetics, and oftentimes requires replacement of the glazing or lens.

Accordingly, attempts have been made to improve the abrasion resistance of transparent plastics. It has been found that silicone resin coating compositions are among the most effective protectants available. Such silicone resin coating compositions were first disclosed by Iler, U.S. Pat. No. 2,786,042, in 1957. More recently, silicone resin scratch-resistant coatings formed from mixtures of silica, such as colloidal silica or silica gel, and hydrolyzable silanes in a hydrolysis medium, such as alcohol and water, were disclosed in U.S. Pat. Nos. 3,708,225, 3,986,997 and 3,976,497. The latest improvements in silicone resin coating compositions are described in U.S. Pat. Nos. 4,177,313, 4,277,287, 4,299,746 and 4,309,319 and in copending U.S. patent application Ser. No. 964,910, filed Nov. 30, 1978. Each of the aforementioned disclosures is hereby incorporated by reference into the present Application.

Although a transparent plastic coated with any of these hard coating compositions is provided a highly desirable protective finish, eventually such hard coating compositions will become scratched or marred. Heretofore it has not been possible to apply a second or refinishing silicone resin coating composition to the first coating composition because of the inability of such second coating to adhere thereto.

The present invention, however, provides a method whereby the surface of the first hard coating composition is etched with a caustic solution so as to provide a surface to which the second or resurfacing coating will readily adhere. The present invention also provides a means for applying a tint to a transparent plastic substrate by utilizing a dye-containing silicone resin hard coating composition applied to the surface of such transparent plastic substrate.

Accordingly, it is an object of the present invention to provide a method for resurfacing a scratched or marred first silicone resin hard coating compositions with a second silicone resin hard coating composition to restore the marred surface to substantially its original condition.

It is another object of the present invention to provide a means for applying a tint to a transparent plastic substrate by utilizing dye-containing silicone resin hard coating composition cured to the surface of such plastic substrate.

Other objects and advantages of the present invention will become obvious from the following detailed description.

SUMMARY OF THE INVENTION

The present invention provides a method for adhering a second silicone resin hard coating composition to a first silicone resin hard coating composition, comprising:

(a) etching the surface of said first silicone resin hard coating composition with a caustic solution;

(b) applying a curable second silicone resin hard coating composition to the etched surface of said first silicone resin hard coating composition; and (c) curing said second silicone resin hard coating composition.

DESCRIPTION OF THE INVENTION

According to the present invention there is provided a method for restoring marred or scratched protective silicone resin coating compositions for transparent plastic substrates to substantially their original condition by resurfacing such silicone resin coating compositions with a second silicone resin coating composition. Generally, this is accomplished by exposing the marred silicone resin hard coating composition to a caustic solution in order to provide a surface to which the second or refinishing silicone resin hard coating composition will adhere. The caustic can be any suitable composition having the general formula MOH, where M is a group IA metal such as Na or K. Preferably such caustic is employed as an aqueous solution having a concentration ranging from approximately 1 weight percent to 50 weight percent. It is important that the silicone hard coating composition be exposed to the caustic solution for a time which is effective for etching the surface of such hard coating composition, but not so long that the intrinsic properties of either the plastic or the silicone hard coating composition are adversely affected. Generally, an exposure of 5 minutes to 60 minutes should be sufficient to adequately etch the surface of the silicone coating composition. It is apparent, of course, that the amount of time required for etching the surface of the marred silicone hard coating composition depends on a variety of factors including the caustic employed, concentration of the caustic, the plastic substrate and the silicone hard coating composition. In the most preferred embodiment etching of the marred silicone resin coating composition is effected by exposing the coating composition for about 30 minutes to an aqueous solution of approximately 10% NaOH.

Although etching of the surface of the silicone hard coating composition is preferably effected by employing a caustic solution, it is also possible to obtain a suitably etched hard coating surface by exposing such surface to an acid solution. It has been found that any protonic acid, for example, sulfuric, hydrochloric or nitric acids or organic acids such as acetic acid, may be utilized in accordance with this embodiment of the present invention. As in the case of caustic etching, the length of time required to effect etching with an acid depends upon the acid employed, concentration of the acid, the plastic substrate and the silicone hard coating composition. The precise conditions required for acid etching can readily be determined by a worker skilled in the art.

In order to insure that the second or refinishing silicone hard coating composition adheres securely to the etched surface of the first silicone hard coating composition, it is desirable that immediately after the etching step that the marred silicone resin coating composition be rinsed of residual caustic. Because the caustic material is most likely to be an aqueous solution, it is preferred that the etched surface of the silicone coating composition be rinsed with water, or more preferably, with distilled water. This will eliminate the possibility of a layer of caustic forming on the first silicone hard coating composition and preventing an effective bond from forming between the two silicone coating compositions and thus lessening the overall integrity of the second silicone layer. However, this rinsing step is not absolutely necessary where sufficiently dilute caustic solutions are employed.

Inasmuch as the silicone resin coating composition is typically provided in an alcohol-water solution, it is not essential that the first silicone coating composition be dried before the second or resurfacing silicone coating composition is applied thereto. However, it is recommended that the caustic or acid etched silicon coating composition either be air dried, blown dry with clean air or oven dried for a short period of time at a temperature well below the melting point of the plastic substrate, for example, on the order of 105° to 110° C. in the case of Lexan ® polycarbonate.

To the etched surface of the first silicone resin coating composition there is applied a curable second silicone resin coating composition. The second silicone resin coating composition can be applied by conventional methods such as flowing, spraying or dipping to form a continuous surface film. The coating thickness can be varied by means of the application technique and preferably coatings are of 0.5 to 20 microns thickness, and more preferably 2 to 10 microns. The first and second silicone resin hard coating compositions can either be the same or different compositions. One example of a suitable silicone hard coating composition is described by Clark in U.S. Pat. Nos. 3,976,497, 3,986,997 and 4,027,073, all of which are incorporated by reference into the present disclosure. This composition comprises a dispersion of colloidal silica in a lower aliphatic alcohol-water solution of the partial condensate of a silanol having the formula R Si(OH)$_3$ where R is selected from the group consisting of alkyl radicals containing from 1 to 3 carbon atoms, vinyl radical, 3,3,3-trifluoropropyl radical, gamma-glycidoxypropyl radical and gamma-methacryloxy propyl radical, with at least 70 percent by weight of said silanol being CH$_3$Si(OH)$_3$. The composition generally contains from 10 to about 50 weight percent solids, said solids consisting essentially of a mixture of from about 10 to about 70 weight percent colloidal silica and from about 30 to about 90 weight percent of the partial condensate of a silanol. The composition further contains sufficient acid to provide a pH in the range of 3.0 to 6.0. The solvent system includes from 20 to about 75 weight percent alcohol, with preferably 50 weight percent isopropanol in the mixture. Water is present in the composition through the silica hydrosol and through condensation of the silanol.

Ubersax describes, in U.S. Pat. No. 4,177,315, another coating composition for clear polymeric substrates comprising about 5 to 50 weight percent solids, the solids comprising about 10 to 70 weight percent silica and about 90 to 30 weight percent of a partially polymerized organic silanol of the general formula R Si(OH)$_3$, wherein R is selected from methyl and up to about 40% of a radical selected from the group consisting of vinyl, phenyl, gamma-glycidoxypropyl, and gamma-methacryloxypropyl; and about 95 to 50 weight percent solvent, the solvent comprising about 10 to 90 weight percent water and about 90 to 10 weight percent lower aliphatic alcohol; the coating composition having a pH of greater than about 6.0 and less than about 8.0. This disclosure is also incorporated by reference into the present application.

Silicone resin hard coating compositions which are particularly suitable for application to General Electric Company's LEXAN ® plastic are disclosed in U.S. Pat. Nos. 4,277,287, 4,299,746, 4,309,319 and U.S. Pat. application Ser. No. 964,910, filed Nov. 30, 1978, each of which is incorporated by reference into the instant disclosure. This series of compositions is manufactured by General Electric Company and sold under the trademark SHC. Generally, these silicone hard coating compositions comprise a dispersion of colloidal silica in an aliphatic alcohol-water solution of the partial condensate of a silanol of the formula R Si(OH)$_3$, wherein R is selected from the group consisting of alkyl having 1 to 3 carbon atoms and aryl, at least 70 weight percent of the silanol being CH$_3$Si(OH)$_3$, said composition containing 10 to 50 weight percent solids, said solids consisting essentially of 10 to 70 weight percent colloidal silica and 30 to 90 weight percent of the partial condensate, said composition having a pH of from about 6.8 to about 7.8, the improvement comprising the intimate admixture of a small amount of polysiloxane polyether copolymer, an ultraviolet light absorbing compound and/or a thickening agent to said composition.

It is intended that the foregoing examples merely illustrate suitable silicone resin hard coating compositions and are not intended to be limiting in any manner. For additional information, such as preparation of the composition, the worker skilled in the art is referred to the pertinent disclosure.

One particularly important use of the method of the present invention is coating plastic lenses, especially acrylic or polycarbonate ophthalmic lenses Following application of the curable second silicone resin hard coating composition to the etched surface of the first silicone resin hard coating composition, such second curable coating composition is cured by means well known to those skilled in the art. It has been found that the most efficient curing is obtained by heating at 90° C. to 135° C. for 20 minutes to 24 hours.

It has also been found that the present invention provides a means for tinting silicone resin hard coating compositions which heretofore were practically impossible to tint. Since highly cross-linked polysiloxanes are rather impervious to attack by most coloring agents, such coloring agents will not adhere to the surface of the silicone resin coating composition.

U.K. patent application Ser. No. 2,025,444A, filed Apr. 11, 1979, discloses a tintable coating composition comprising the hydrolysis product of about 35 to 70 weight percent tetraethyl orthosilicate and 20 to 60 weight percent of methyltrimethoxysilane, methyltriethoxysilane, ethyltriethoxysilane, ethyltrimethoxysilane, dimethyldimethoxysilane, dimethyldiethoxysilane or a mixture thereof and 0 to 20 weight percent of a siloxane having a reactive polar site such as 3-chloropropyltrimethoxysilane, 3-glycidylpropyltrimethoxysilane or 3-methacryloxypropyltrimethoxysilane. Alternatively, in place of the siloxane containing a reactive polar site there can be used certain surfactants such as Triton X 100, a polyethylene oxide derivative of nonyl phenyl manufactured by Rohm and Haas Company.

Another example of a tintable coating composition is described in U.S. Pat. No. 4,211,823. This composition comprises hydrolysates of silane compounds containing an epoxy group and not less than two alkoxyl groups which are directly bonded to an Si atom in the molecule, fine particles of silica having an average diameter of about 1 to 100 millicrons and an aluminum chelate compound.

The present invention provides a method for applying tinted silicone resin hard coating compositions to either the plastic substrate or the marred silicone coating composition cured thereto. Generally, a suitable dye or tint is incorporated into the silicone hard coating composition before it is applied to the substrate and cured. By a suitable dye is meant one that is soluble in the solvent system of the silicone resin coating composition and which also is compatible with the pH requirements of such silicone resin coating composition. The most preferred dyes and tints are soluble in an alcohol-water solvent system, such as, for example, metal complex dyes which are manufactured by Sandoz Company and sold under the trademark Acetosol Dyes. Another suitable dye is Dip'N Tint sold by American Optical.

In accordance with one embodiment of the present invention, the curable tinted silicone resin coating composition is applied over an optically clear, but marred or scratched first silicone hard coating composition. The application and curing of such dye-containing silicone coating compositions is effected in the same manner as described hereinabove for clear refinishing silicone coating compositions. The extent of substrate darkening is a function of dye color, dye concentration and thickness of the refinishing coating composition. It has been found that tinting a marred first silicone hard coating composition in this manner does not measurably interfere with adhesion, abrasion resistance or bath life of the coating composition. Of course, this method can also be used to apply a tint to a plastic substrate having a protective silicone coating thereon which is not scratched or marred. However, one important advantage of the present invention is that after having the refinishing silicone hard coating applied and cured to the substrate, it will be in substantially its original condition. That is, unlike earlier methods for tinting silicone hard coating compositions which merely tinted over scratches, the present invention provides a completely refinished product having scratches filled in and thus virtually eliminated.

Moreover, when utilizing prior art processes to refinish a plastic substrate having a silicone coating composition thereon, it would first be necessary to remove the silicone coating composition, then apply and cure a new silicone coating composition, and finally, apply a tint to such new silicone coating composition. By the present invention, however, it is not necessary to remove the first silicone coating composition or apply a tint after curing the new silicone coating composition.

Thus there is provided a method for restoring to substantially its original condition a transparent plastic having thereon a marred or scratched silicone hard coating composition. In order that those skilled in the art might be better able to practice the present invention, the following examples are given by way of illustration and not by way of limitation.

EXAMPLE 1

One surface of a panel of LEXAN ® polycarbonate plastic having cured thereon an SHC TM -1000 silicone resin coating composition (pH of 6.8 to 7.8 and sold by General Electric Company) was etched by soaking the surface for 30 minutes with an aqueous solution of 10% NaOH. The surface was then rinsed copiously with distilled water and dried. To the etched surface, a second coating of SHC TM -1000 silicone resin coating composition was applied. After 30 minutes air drying and 1 hour curing at 120° C. the new layer of silicone hard coating showed no loss of adhesion to tape pulling. A second silicone hard coating composition applied in the same manner to the untreated side of the plastic substrate was 100% removed on the first pull of the tape.

EXAMPLE 2

Several LEXAN ® plastic lenses having thereon a cured coating of SHC TM -1200 silicone resin coating composition (sold by General Electric Company) were immersed for 30 minutes in an aqueous solution of 10% NaOH. The lenses were then rinsed in distilled water and recoated with an additional layer of SHC-1200 silicone coating composition. A portion of the lenses were cured at 120° C. for 35 minutes and the remainder were cured at 120° C. for 24 hours. Lenses cured for 35 minutes and 24 hours both showed good scribed adhesion. Upon being subjected to 65° C. water immersion testing, the shorter cure time gave rise to tape pull failure after 65 hours soaking whereas the longer cure time gave over 190 hours soaking without loss of adhesion.

EXAMPLE 3

1.0 gram Acetosol Red BLS dye (sold by Sandoz Company) was dissolved in 5.0 grams diacetone alcohol. 2.0 grams isopropanol were added and this solution was mixed into one liter of SHC-1200 silicone resin coating composition. A LEXAN ® polycarbonate lens having cured thereon an SHC-1200 hard coating composition was etched and prepared as in Example 2. The lens was then dipped into the SHC-1200 solution containing the dye. A cure at 125° C. for 1.5 hours gave a deep red tinted lens with good adhesion and abrasion resistance to 0000 steel wool. The dyed SHC TM -1200 was still useable for coating purposes after six months under normal refrigerated storage conditions.

I claim:

1. A method for adhering a second silicone resin hard coating composition to a first silicone resin hard coating composition, comprising:
    (a) etching the surface of said first silicone resin hard coating composition with a caustic solution;
    (b) applying a curable second silicone resin hard coating composition to the etched surface of said first silicone resin hard coating composition; and
    (c) curing said second silicone resin hard coating composition.

2. The method of claim 1 wherein the caustic material for effecting etching of the surface of the first silicone resin hard coating composition has the general formula M OH, where M is a Group IA metal.

3. The method of claim 1 wherein the concentration of the caustic solution for effecting etching of the surface of the first silicone resin hard coating composition ranges from 1 weight percent to 50 weight percent.

4. The method of claim 1 wherein etching the surface of the first silicone resin hard coating composition is effected by exposing said surface to a caustic solution for 1 minute to 60 minutes.

5. The method of claim 1 wherein etching the surface of the first silicone resin hard coating composition is effected by exposing said surface to an aqueous solution of 10% NaOH for 30 minutes.

6. The method of claim 1 wherein the curable second silicone resin hard coating composition includes a dye.

7. The method of claim 6 wherein the dye is soluble in an alcohol-water solvent system.

8. The method of claim 1, further comprising rinsing residual caustic material from the surface of the first silicone resin hard coating composition prior to applying the curable second silicone resin hard coating composition.

9. The method of claim 8, further comprising drying the surface of the first silicone resin hard coating composition after rinsing residual caustic material therefrom and prior to applying the curable second silicone resin hard coating composition thereto.

10. The method of claim 1 wherein etching the surface of said first silicone resin hard coating composition is effected with an acid solution.

11. The method of claim 10 wherein said acid is selected from the group consisting of sulfuric acid, hydrochloric acid, nitric acid, and acetic acid.

12. A method for adhering a second silicone resin hard coating composition to a first silicone resin hard coating composition, comprising:
 (a) etching the surface of said first silicone resin hard coating composition by exposing said surface to an aqueous solution of 10% NaOH for 30 minutes;
 (b) rinsing residual caustic material from said etched surface of the first silicone resin hard coating composition
 (c) drying said etched surface of the first silicone resin hard coating composition;
 (d) applying a curable second silicone resin hard coating composition to said etched surface of the first silicone resin hard coating composition; and
 (e) curing said second silicone resin hard coating composition.

13. An article comprising:
 (a) a plastic substrate;
 (b) a first silicone resin hard coating composition cured to said plastic substrate; and
 (c) a second silicone resin hard coating composition cured to said first silicone resin hard coating composition, wherein curing of said second silicone resin hard coating composition to said first silicone resin hard coating composition is effected by:
  (1) etching the surface of said first silicone resin hard coating composition with a caustic solution;
  (2) applying said curable second silicone resin hard coating composition to the etched surface of said first silicone resin hard coating composition; and
  (3) curing said second silicone resin hard coating composition.

14. An article in accordance with claim 13 wherein said second silicone resin hard coating composition comprises a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0.

15. An article in accordance with claim 13 wherein said second silicone resin hard coating composition comprises about 5 to about 50 weight percent solids, said solids comprising about 10 to 70 weight percent silica and about 90 to 30 weight percent of a partially polymerized organic silanol of the general formula $RSi(OH)_3$, wherein R is selected from methyl and up to about 40% of a radical selected from the group consisting of vinyl, phenyl, gamma-glycidoxypropyl and gamma-methacryloxypropyl; and about 95 to 50 weight percent solvent, said solvent comprising about 10 to 90 weight percent water and about 90 to 10 weight percent lower aliphatic alcohol; said coating composition having a pH of greater than about 6.0 and less than about 8.0.

16. An article in accordance with claim 13 wherein said second silicone resin hard coating composition comprises a dispersion of colloidal silica in an aliphatic alcohol-water solution of the partial condensate of a silanol of the formula $RSi(OH)_3$, wherein R is selected from the group consisting of alkyl having 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, and an effective amount of polysiloxane polyether copolymer, said composition having a pH of from 7.1 to about 7.8.

17. An article in accordance with claim 13 wherein said second silicone resin hard coating composition comprises a dispersion of colloidal silica having a particle size of from 5 to 150 millimicrons in diameter in a lower aliphatic alcohol-water solution of the partial condensate of a silanol of the formula $RSi(OH)_3$, wherein the lower aliphatic alcohol-water solvent contains from about 20 to 75 weight percent of said lower aliphatic alcohol component and wherein R is selected from the group consisting of alkyl having from 1 to 3 carbon atoms and aryl, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, the composition further containing from about 0.1 to about 1 percent by weight of a thickening agent selected from the group consisting of hydroxypropyl guar gum and hydroxypropyl cellulose, said composition having a pH of 7.1 to about 7.8.

18. An article in accordance with claim 13 wherein said second silicone resin hard coating composition comprises a dispersion of colloidal silica in a lower aliphatic alcohol-water solution of the partial condensate of a silanol of the formula $RSi(OH)_3$, wherein R is selected from the group consisting of alkyl having from 1 to 3 carbon atoms and aryl, wherein at least 70 weight percent of the dilanol is $CH_3Si(OH)_3$; and a small amount of an ultraviolet light absorbing compound, said composition containing 10 to 50 weight percent solids, said solids consisting essentially of 10 to 70 weight percent colloidal silica and 30 to 90 weight percent of the partial condensate, and wherein said composition has a pH of from 6.8 to 7.8.

19. An article in accordance with claim 13 wherein said plastic substrate is transparent.

20. An article in accordance with claim 13 wherein said plastic substrate is polycarbonate polymer.

21. An article in accordance with claim 13 wherein said plastic substrate is acrylic polymer.

22. An article in accordance with claim 19 in the form of a lens.

23. An article in accordance with claim 22 wherein the lens is an ophthalmic lens.

24. An article in accordance with claim 13 wherein the second silicone resin hard coating composition includes a dye.

25. An article in accordance with claim 24 wherein the dye is soluble in a water-alcohol solvent system.

26. An article in accordance with claim 13 wherein etching the surface of said first silicone resin hard coating composition is effected with an acid solution.

27. An article in accordance with claim 26 wherein said acid is selected from the group consisting of sulfuric acid, hydrochloric acid, nitric acid and acetic acid.

* * * * *